Jan. 27, 1970  YOSHIHISA KOAZE ET AL  3,492,204
PROCESS FOR THE PRODUCTION OF ACID PROTEASE
BY CULTIVATION OF MICROORGANISMS
Filed March 30, 1966  8 Sheets-Sheet 1

INVENTORS
YOSHIHISA KOAZE, HITOSHI GOI &
TAKESHI HARA
BY
Mason, Fenwick & Lawrence
ATTORNEYS

Fig-3

Absorption Spectra of Acid Proteases A and B.
——— Acid Protease A and
- - - - Acid Protease B in
0.01 N HCl

Fig-4

Fig-5A
MILK CASEIN

Fig-5B
EGG ALBUMIN

ACID-DENATURED HEMOGLOBIN

Fig-5C

UREA-DENATURED HEMOGLOBIN

Fig-5D

WHEAT GLUTEN

Fig-5E

BLOOD FIBRIN

Fig-5F

GELATIN

Fig-5G

COLLAGEN

Fig-5H

Fig-6 Pattern of Amino Acids Analysis on Milk Casein Hydrolyzed with Acid Protease B.

Fig-7 Pattern of Amino Acids Analysis on Milk Casein Hydrolyzed with Acid Protease A.

Fig-8A ACID PROTEASE A

Fig-8B ACID PROTEASE B

United States Patent Office 3,492,204
Patented Jan. 27, 1970

3,492,204
PROCESS FOR THE PRODUCTION OF ACID PROTEASE BY CULTIVATION OF MICROORGANISMS
Yoshihisa Koaze, Tokyo, Hitoshi Goi, Kawasaki-shi, and Takeshi Hara, Tokyo, Japan, assignors to Meiji Seika Kaisha, Ltd., Tokyo, Japan, a corporation of Japan
Filed Mar. 30, 1966, Ser. No. 538,715
Claims priority, application Japan, Mar. 31, 1965, 40/18,279, 40/18,280
Int. Cl. C12k 1/10; C12d 13/10; C07g 7/02
U.S. Cl. 195—66    4 Claims

ABSTRACT OF THE DISCLOSURE

The production of acid protease A and acid protease B is accomplished by cultivating a strain of *Aspergillus niger* in a culture medium containing a greater concentration of organic nitrogen than used formerly. Such cultivation produces acid protease A having an optimum active pH at pH 2.0, 30° C. and a high activity at pH 1.5, 55° C. and acid protease B having an optimum active pH at pH 2.6, 30° C. and substantially no activity at pH 1.5, 55° C.

This invention relates to a process for the production of acid protease by cultivation of microorganisms. In particular, the present invention relates to the process for the production of acid protease B which has an optimal active pH at pH 2.6 and loses its activity at pH 1.5 and at a temperature above 50° C. and new high acid protease A which has an optimal active pH at pH 2.0 and exhibits high activity even at pH 1.5 and at a temperature above 50° C. by both solid and liquid cultivation of a strain belonging to family Aspergillaceae including mainly *Aspergillus niger* group, using a culture medium with considerably increased amount of organic nitrogen source.

Throughout the following specification each reference to the strain DBD–0406, mentioned above, is to be read as DBD–0406 (ATCC 16513).

We have found from our studies on the enzymes produced by microorganisms that a new strain *Aspergillus niger* var. *macrosporus* DBD–0406 belonging to *Aspergillus niger* group isolated from soil by using a special acid medium may produce both acid protease B and new high acid protease A at the same time, acid protease B having an optimal active pH at pH 2.6 and losing its activity at pH 1.5 and at a temperature above 50° C. and new high acid protease A having an optimal pH at pH 2.0 and exhibiting high activity even at pH 1.5 and at a temperature above 50° C., and have succeeded to make the production of said both acid protease rapid progress by considerably increasing the amount of organic nitrogen source in both solid medium and liquid medium.

The microbial characteristics of *Aspergillus niger* var. *macrosporus* DBD–0406 strain is as follows:

(1) Conidial heads __________ Black.
(2) Assimilation of nitrate ____ None.
(3) Conidia _________________ Globose when ripe, conspicuously echinulate.
(4) Diameter of conidia _______ 4.9–5.9μ (average 5.4μ).
(5) Vesicles ________________ Globose, rarely subglobose.
(6) Diameter of vesicles ______ 58–70μ (average 67μ).
(7) Length of 1st sterigmata___ 18–30μ (average 26μ).
(8) Length of 2nd sterigmata__ 5–8μ (average 7μ).
(9) Length of conidiophores___ 1.75–3.13 mm. (average 2.29 mm.).

The above strain was deposited in the American Type Culture Collection on Mar. 30, 1966, under the number of 16513.

Figure 1:
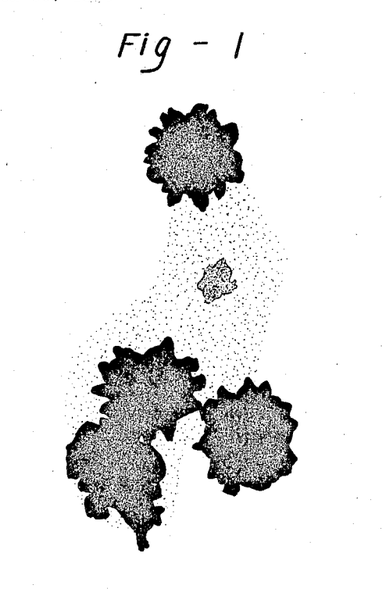
FIGURE 1 is a reproduced diagram of electron microscopic photograph of the conida of the strain DBD–0406 belonging to *Aspergillus niger* var. *macrosporus*.
Figure 2:
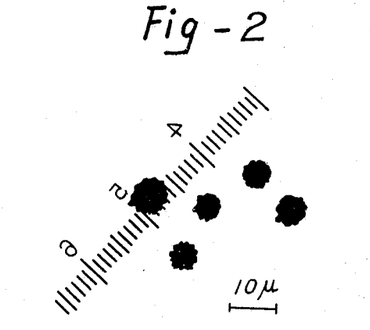
FIGURE 2 is a reproduced diagram of optical microscopic photograph of the conidia of the strain DBD–0406 belonging to *Aspergillus niger* var. *macrosporus*.
Figure 3:
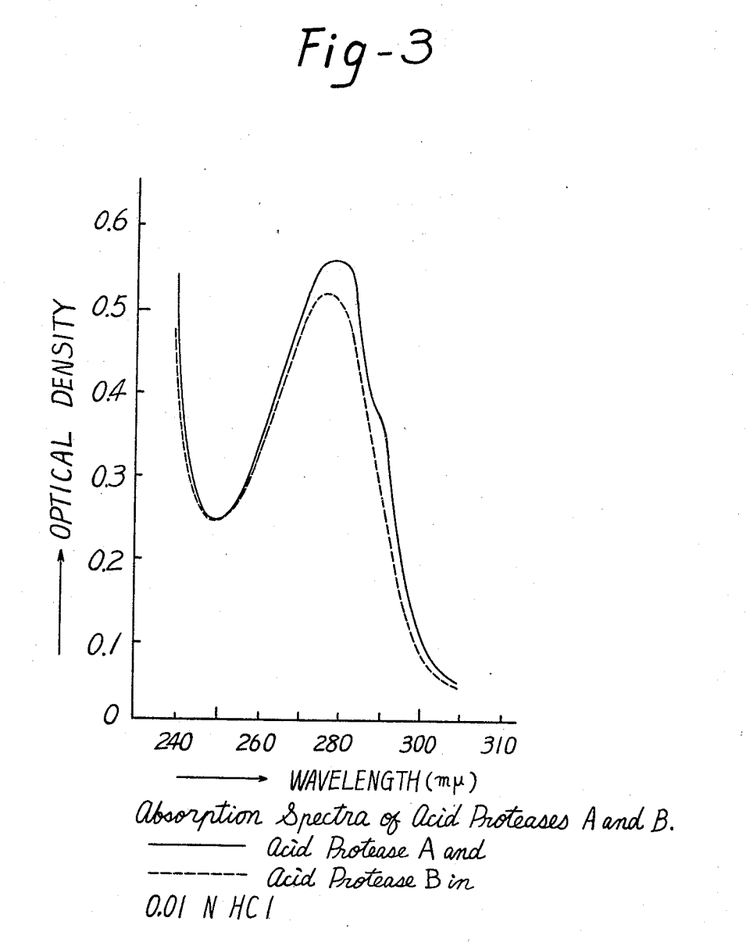
FIGURE 3 is an ultraviolet absorption spectrum of new high acid protease A and acid protease B.
Figure 4:
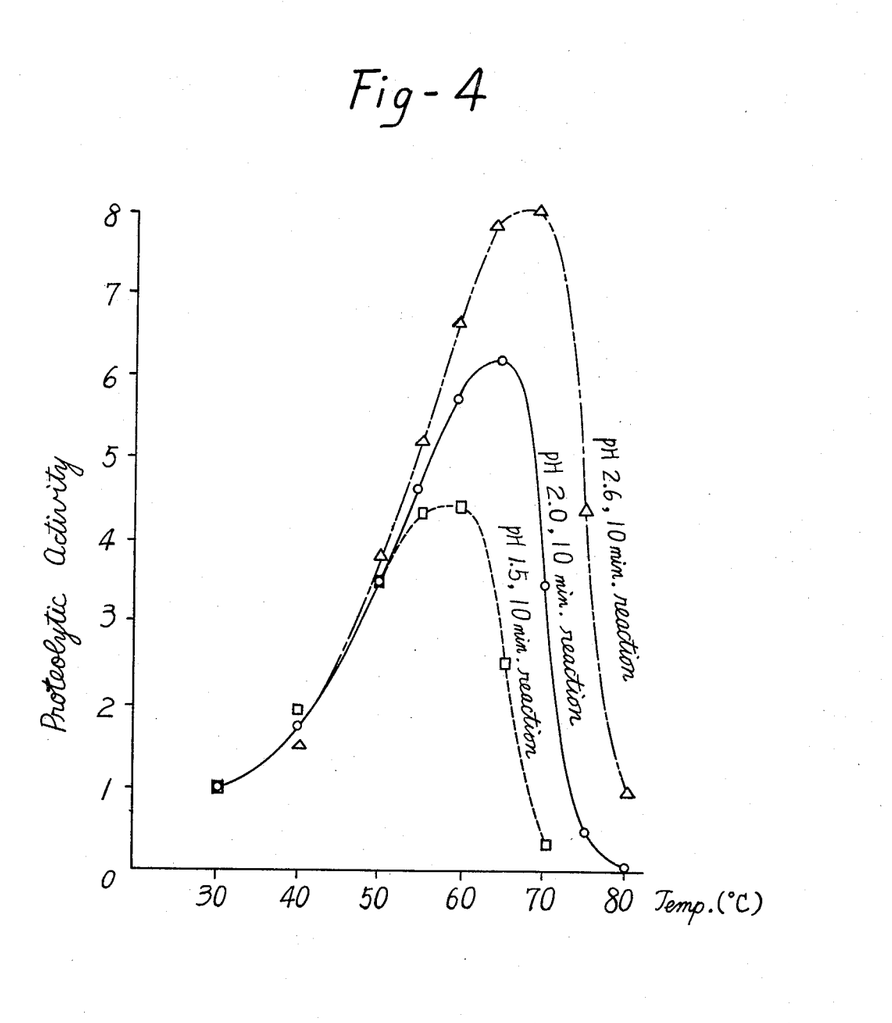
FIGURE 4 is the curves showing phenomena of temperature and pH on proteolytic activity of the new acid protease.
Figure 5A:
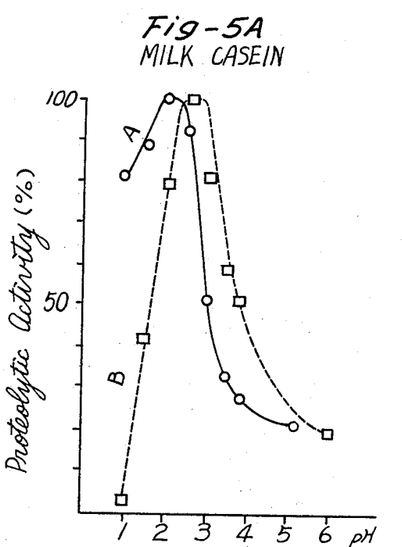
FIGURES 5A, B, C, D, E, F, G and H show the effects of pH on various protein digestions by acid protease A and B indicated by lines A and B respectively.
Figure 5B:
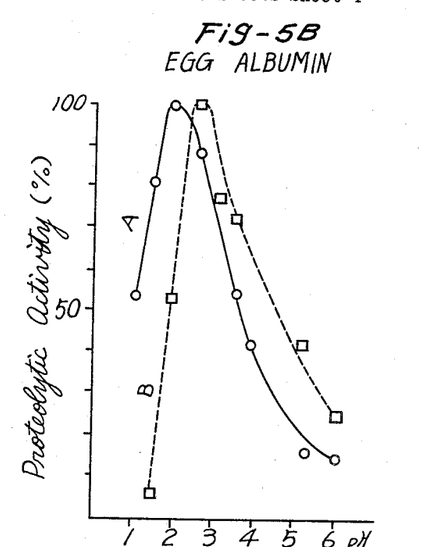
Figure 5C:
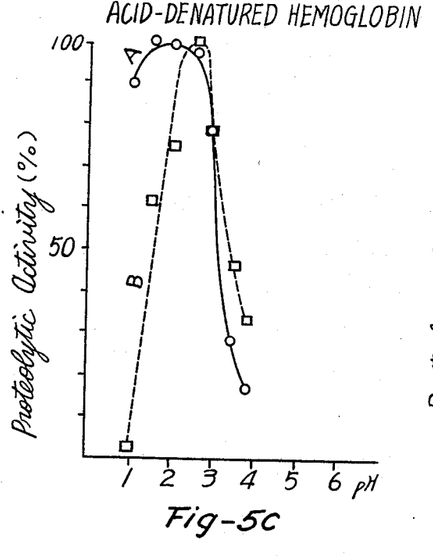
Figure 5D:
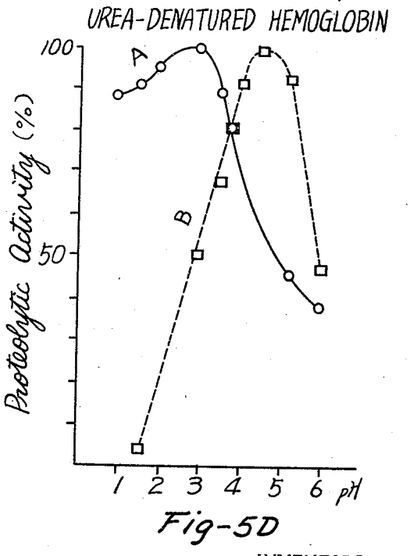
Figure 5E:
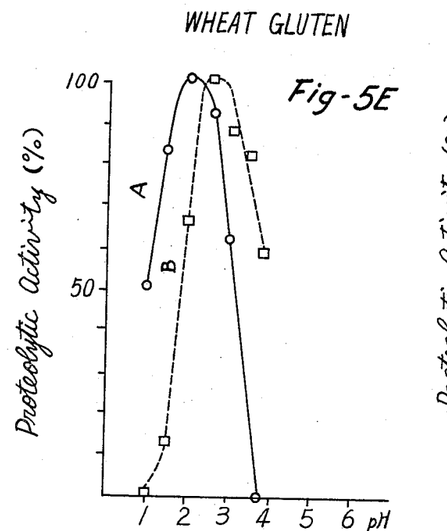
Figure 5F:
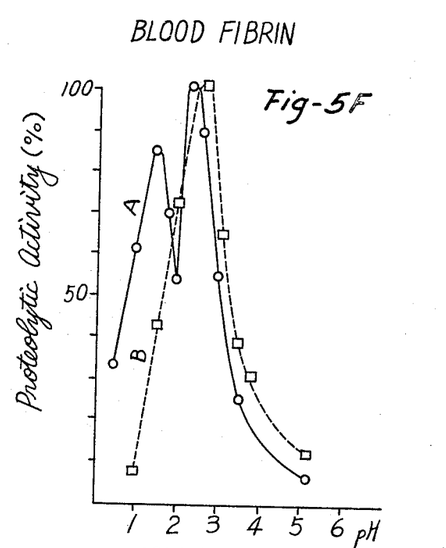
Figure 5G:
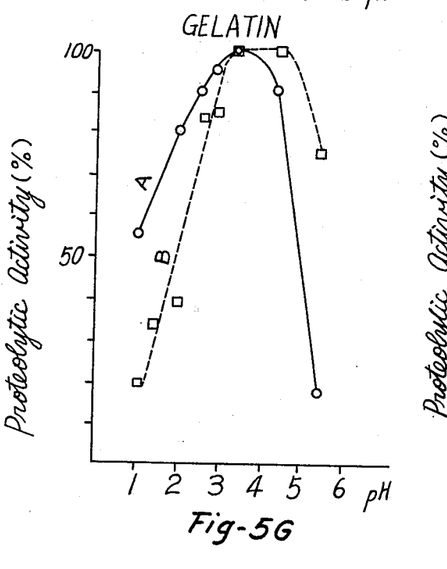
Figure 5H:
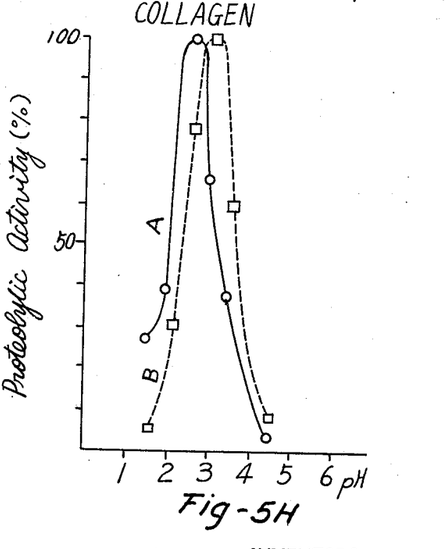
Figure 6:
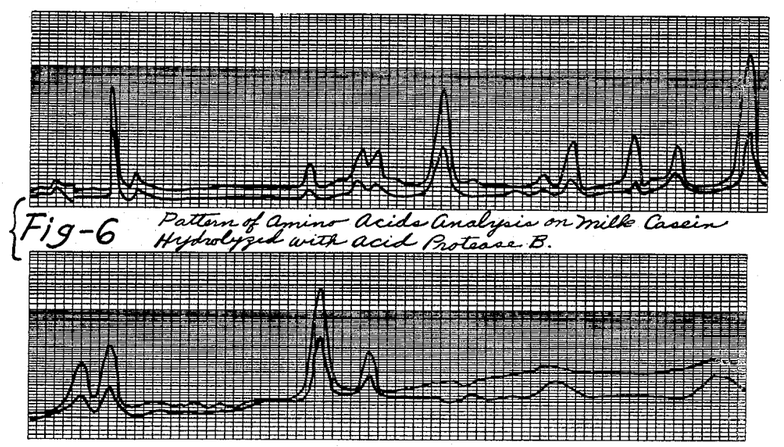
FIGURE 6 is a pattern of amino acids analysis on milk casein hydrolyzed with acid protease B.
Figure 7:
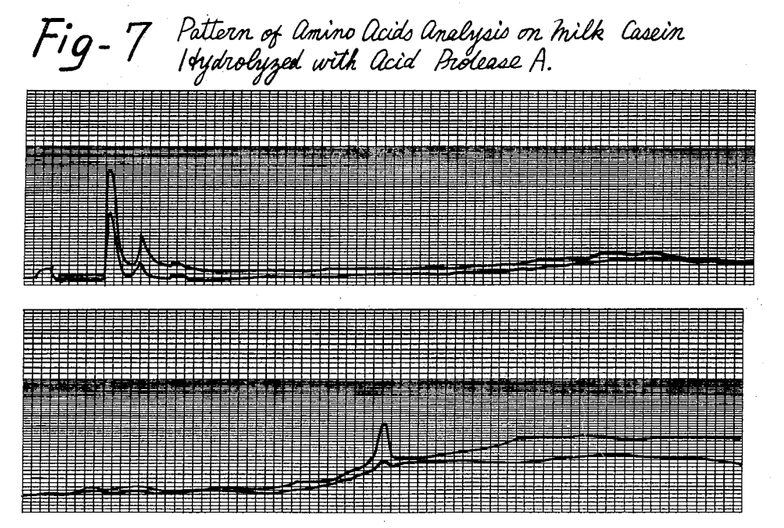
FIGURE 7 is a pattern of amino acids analysis on milk casein hydrolyzed with acid protease A.
Figure 8A:
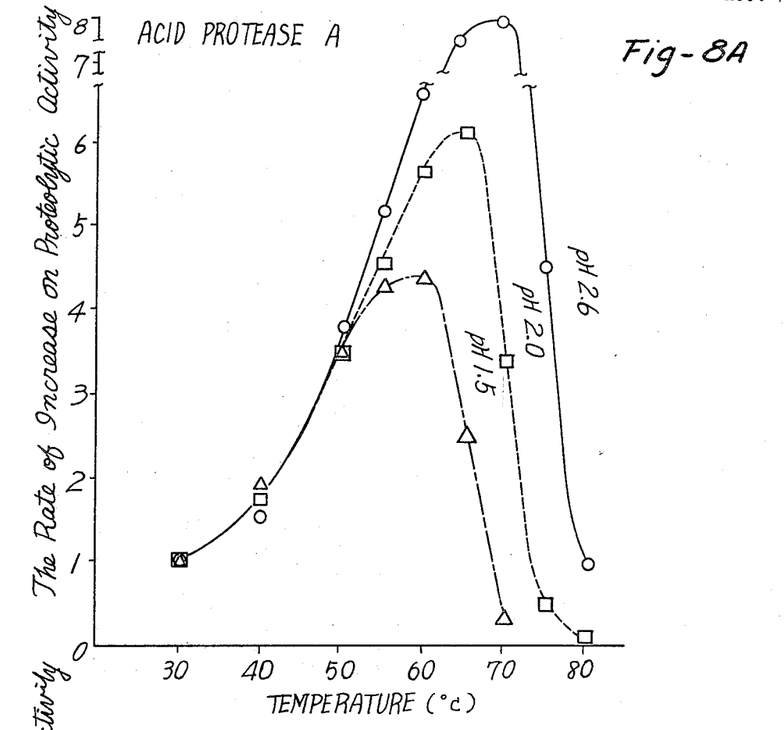
FIGURES 8A, B show the effects of temperatures on milk casein digestion by acid proteases A and B.
Figure 8B:
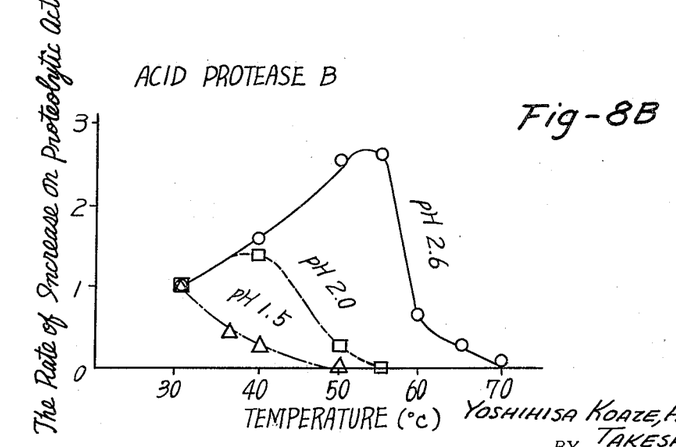
Figure 9A:
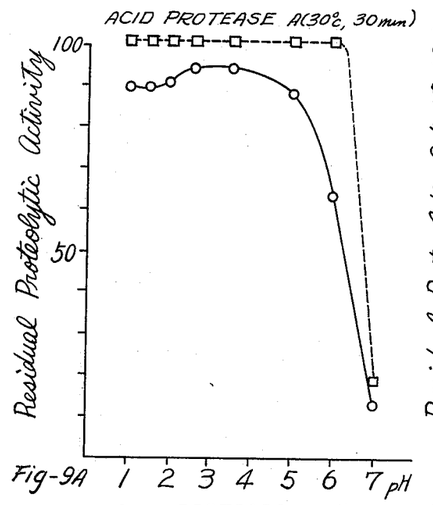
FIGURES 9A, A', B, B' show the head and pH stabilities of acid proteases A and B.
Figure 9B:
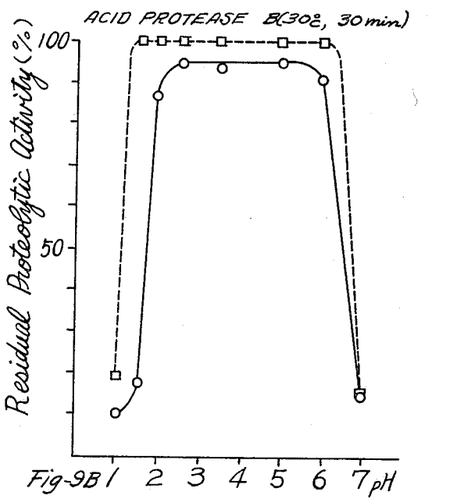

The shape of the conidia of *Aspergillus niger* var. *macrosporus* is shown in FIGURES 1 and 2.

According to the present invention we have succeeded to make the production of acid protease A twice or more usual production in the solid cultivation as shown in Tables 1–3 by making organic nitrogen content in the medium containing organic nitrogen sources only above 2.5% by adding organic substance having comparatively low nitrogen content such as bran together with the organic substance having comparatively high nitrogen content such as defatted soy bean meal or making organic nitrogen/inorganic nitrogen in the medium containing both organic and inorganic nitrogen sources above 4 by combined use of inorganic nitrogen source and organic nitrogen source, the inorganic nitrogen source such as ammonium sulfate and the like being made 0.6% as inorganic nitrogen and the organic nitrogen source being composed of the organic substance having comparatively low nitrogen content such as bran and the organic substance having comparatively high nitrogen content such as defatted soy bean meal which are mixed in such an amount that the organic nitrogen content may become above 2.5%.

TABLE 1.—EFFECT OF INCREASE OF ORGANIC NITROGEN IN A SOLID CULTURE MEDIUM ON THE PRODUCTION OF ACID PROTEASE A BY THE CULTIVATION OF *ASPERGILLUS NIGER* VAR. *MACROSPORUS* DBD–0406

| Components of medium (g.) | | | |
|---|---|---|---|
| Bran | Defatted soy-bean meal | Organic nitrogen (percent) | Productivity of acid protease A |
| 5.0 | 0 | 2.2 | 100 |
| 4.75 | 0.25 | 2.5 | 168 |
| 4.5 | 0.5 | 2.8 | 186 |
| 4.0 | 1.0 | 3.3 | 193 |
| 3.0 | 2.0 | 4.4 | 200 |
| 2.5 | 2.5 | 5.0 | 207 |
| 2.0 | 3.0 | 5.5 | 179 |

TABLE 2.—EFFECT OF INCREASE OF ORGANIC NITROGEN IN COMBINATION OF ORGANIC AND INORGANIC NITROGEN IN A CULTURE MEDIUM ON THE PRODUCTION OF ACID PROTEASE A BY THE CULTIVATION OF *ASPERGILLUS NIGER* VAR. *MACROSPORUS* DBD-0406

| Components of medium | | | Organic nitrogen (percent) | Inorganic nitrogen (percent) | Organic nitrogen/ inorganic nitrogen | Productivity of acid protease A |
| --- | --- | --- | --- | --- | --- | --- |
| Bran (g.) | Defatted soybean meal (g.) | Ammonium sulfate (mg.) | | | | |
| 5 | 0 | 0 | 2.2 | 0 | | 100 |
| 5 | 0 | 25 | 2.2 | 0.1 | 22 | 182 |
| 5 | 0 | 50 | 2.2 | 0.2 | 10 | 196 |
| 5 | 0 | 150 | 2.2 | 0.6 | 3.7 | 143 |
| 5 | 0 | 250 | 2.2 | 1.1 | 2.0 | 89 |
| 2.5 | 2.5 | 0 | 5 | 0 | | 179 |
| 2.5 | 2.5 | 25 | 5 | 0.1 | 50 | 225 |
| 2.5 | 2.5 | 50 | 5 | 0.2 | 25 | 200 |
| 2.5 | 2.5 | 150 | 5 | 0.6 | 8.3 | 179 |
| 2.5 | 2.5 | 250 | 5 | 1.1 | 4.5 | 136 |

TABLE 3.—EFFECT OF INCREASE OF ORGANIC NITROGEN IN COMBINATION OF ORGANIC AND INORGANIC NITROGEN IN A CULTURE MEDIUM OM THE PRODUCTION OF ACID PROTEASE A BY THE CULTIVATION OF *ASPERGILLUS NIGER* VAR. *MACROSPORUS* DBD-0406

| Components of medium | | | Organic nitrogen (percent) | Inorganic nitrogen (percent) | Organic nitrogen/ Inorganic nitrogen | Productivity of acid protease A |
| --- | --- | --- | --- | --- | --- | --- |
| Bran (g.) | Defatted soybean meal (g.) | Ammonium sulfate (mg.) | | | | |
| 5 | 0 | 150 | 2.2 | 0.6 | 3.7 | 100 |
| 4.75 | 0.25 | 150 | 2.5 | 0.6 | 4.2 | 191 |
| 4.5 | 0.5 | 150 | 2.8 | 0.6 | 4.7 | 213 |
| 4 | 1 | 150 | 3.3 | 0.6 | 5.5 | 235 |
| 3 | 2 | 150 | 4.4 | 0.6 | 7.3 | 252 |
| 2.5 | 2.5 | 150 | 5 | 0.6 | 8.3 | 261 |
| 2 | 3 | 150 | 5.5 | 0.6 | 9.2 | 226 |
| 1 | 4 | 150 | 6.6 | 0.6 | 11.0 | 196 |
| 0 | 5 | 150 | 7.7 | 0.6 | 12.8 | 187 |

Further in this case the yield of acid protease may be increased more than 40—60% or up to near twice as shown in Table 4 by adding water to the medium in an amount more than equal to the content of the solid matter of the medium.

TABLE 4.—EFFECT OF THE AMOUNT OF WATER ADDED TO SOLID CULTURE MEDIUM ON THE PRODUCTION OF ACID PROTEASE A BY THE CULTIVATION OF *ASPERGILLUS NIGER* VAR. *MACROSPORUS* DBD-0406

| Added water | 80% | 100% | 120% |
| --- | --- | --- | --- |
| Ratio of the production of acid protease A: | | | |
| Culture medium 1 | 100 | 133 | 222 |
| Culture medium 2 | 100 | 124 | 153 |

Culture medium 1: Mixture of bran and defatted soybean meal (1:1).
Culture medium 2: Mixture of bran and defatted soybean meal (7:3).

We have studied on the production of acid protease A of the known fungi by applying this new solid culture method on them. According to our studies, the strains belonging to Family Aspergillaceae including mainly *Aspergillus niger* group, *Aspergillus niger*, *Aspergillus niger* mut. *shiemanni*, *Aspergillus aureus* var. *acidus*, *Aspergillus aureus* var. *brevis*, *Aspergillus baratae*, *Pencillium frequentans* and *Pencillium thomii* have been observed to show excellent results as shown in Table 5.

TABLE 5.—EFFECT OF INCREASE OF ORGANIC NITROGEN SOURCES IN A SOLID CULTURE MEDIUM ON THE PRODUCTION OF ACID PROTEASE A BY THE CULTIVATION OF SEVERAL STRAINS BELONGING TO FAMILY ASPERGILLACEAE

| Microorganisms | Productivity of Acid protease A, percent | |
| --- | --- | --- |
| | Culture medium 1 | Culture medium 2 |
| *Asp. niger* var. *macrosporus* | 100 | 158 |
| *Asp. niger* | 100 | 149 |
| *Asp. niger* mut. *shiemanni* | 100 | 202 |
| *Asp. aureus* var. *acidus* | 100 | 472 |
| *Asp. aureus* var. *brevis* | 100 | 467 |
| *Asp. batatae* | 100 | 147 |
| *Pen. frequentans* | 100 | 263 |
| *Pen. thomii* | 100 | 108 |

Culture medium 1: Bran only, added water 80% (organic nitrogen: 2.2%).
Culture medium 2: Mixture of bran and defatted soybean meal (1:1), added water 120% (organic nitrogen: 5%).

Further we have succeeded to make the production of acid protease A twice or more than usual production in the liquid cultivation too as shown in Table 6 by making the nitrogen content in the medium containing organic nitrogen sources only above 0.4% or in case the medium contains both organic nitrogen source and inorganic nitrogen source, making the organic nitrogen/inorganic nitrogen in the medium more than 6 by using the inorganic nitrogen source such as ammonium sulfate in such an amount as the nitrogen content thereof come to below 0.06% and by adding the organic nitrogen source such as defatted soy bean meal, corn steep liquor in such considerable amount as the nitrogen content thereof come to more than 0.4%.

TABLE 6.—EFFECT OF INCREASE OF ORGANIC NITROGEN SOURCES IN A LIQUID CULTURE MEDIUM ON THE PRODUCTION OF ACID PROTEASE A BY THE CULTIVATION OF *ASPERGILLUS NIGER* VAR. *MACROSPORUS* DBD-0406

| Nitrogen sources (percent) | | | Organic nitrogen (percent) | Inorganic nitrogen (percent) | Organic nitrogen/ Inorganic nitrogen | Productivity of acid protease A |
| --- | --- | --- | --- | --- | --- | --- |
| Defatted soybean meal | Corn steep liquor | Ammonium sulfate | | | | |
| 3 | 1 | 0 | 0.26 | 0 | | 100 |
| 6 | 1 | 0 | 0.49 | 0 | | 174 |
| 8 | 1 | 0 | 0.65 | 0 | | 163 |
| 3 | 1 | 1.0 | 0.26 | 0.21 | 1.2 | 82 |
| 6 | 1 | 0.3 | 0.49 | 0.06 | 8.1 | 272 |

According to our studies on the production of acid protease A of the known fungi by applying this new liquid culture method, aforesaid *Aspergillus niger* group except *Penicillium frequentans* and *Pen. thomii* have been observed to show excellent results as shown in Table 7.

TABLE 7.—EFFECT OF INCREASE OF ORGANIC NITROGEN SOURCES IN A LIQUID CULTURE MEDIUM ON THE PRODUCTION OF ACID PROTEASE A BY THE CULTIVATION OF SEVERAL STRAINS BELONGING TO *BLACK ASPERGILLI*

| Microorganisms | Productivity of acid protease A, percent, culture media | | | |
|---|---|---|---|---|
| | 1 | 2 | 3 | 4 |
| *Asp. niger* var. *macrosporus* | 100 | 173 | 163 | 192 |
| *Asp. niger* | 100 | 260 | 248–339 | 400–429 |
| *Asp. niger* mut. *shiemanni* | 100 | 133 | 580 | 327 |
| *Asp. aureus* | 100 | 164 | 345 | 309 |
| *Asp. aureus* var. *brevis* | 100 | 333 | 400 | 367 |
| *Asp. batatae* | 100 | | 131 | 138 |

Culture medium 1: Starch 1%, defatted soy bean meal 3%, corn steep liquor 1%, $K_2HOP_4$ 0.1%, $CaCO_3$ 1%.
Culture medium 2: Defatted soy bean meal 6% instead of 3% in the culture medium 1.
Culture medium 3: Defatted soy bean meal 8% instead of 3% in the culture medium 1.
Culture medium 4: Ammonium sulfate 0.3% is added to the culture medium 2.

On the other hand, according to the present invention we have succeeded to increase the production of acid protease B in the solid cultivation more than 40–60% or up to near twice as shown in Tables 8–14 by making the organic nitrogen content in the medium containing organic nitrogen sources only above 4% by combined use of the organic substance having comparatively low nitrogen content such as bran and the organic substance having comparatively high nitrogen content such as defatted soy bean meal, corn steep liquor, defatted cotton seed meal or making organic nitrogen/inorganic nitrogen in the medium containing both organic and inorganic nitrogen sources above 6 by combined use of inorganic nitrogen source and organic nitrogen source, the inorganic nitrogen source such as ammonium sulfate being made below 0.8% as inorganic nitrogen and the organic nitrogen being composed of the organic substance having comparatively low nitrogen content such as bran and the organic substance having comparatively high nitrogen content such as defatted soy bean meal, defatted cotton seed meal which are mixed in such an amount that the organic nitrogen content may become above 4%.

TABLE 8.—EFFECT OF INCREASE OF ORGANIC NITROGEN IN A SOLID CULTURE MEDIUM ON THE PRODUCTION OF ACID PROTEASE B BY THE CULTIVATION OF *ASPERGILLUS NIGER* VAR. *MACROSPORUS*

| Bran (g.) | Defatted cotton seed meal (g.) | Organic nitrogen (percent) | Productivity of acid protease B |
|---|---|---|---|
| 5.0 | 0 | 2.2 | 100 |
| 4.5 | 0.5 | 2.7 | 101 |
| 4.0 | 1.0 | 3.1 | 102 |
| 3.0 | 2.0 | 4.0 | 112 |
| 2.5 | 2.5 | 4.5 | 125 |
| 2.0 | 3.0 | 5 | 141 |
| 1.0 | 4.0 | 5.9 | 154 |
| 0 | 5.0 | 6.8 | 159 |

TABLE 9.—EFFECT OF INCREASE OF ORGANIC NITROGEN IN A SOLID CULTURE MEDIUM ON THE PRODUCTION OF ACID PROTEASE B BY THE CULTIVATION OF *ASPERGILLUS NIGER* var. *MACROSPORUS* DBD-0406

| Bran (g.) | Defatted soy bean meal (g.) | Organic nitrogen (percent) | Productivity of acid protease B |
|---|---|---|---|
| 5.0 | 0 | 2.2 | 100 |
| 4.5 | 0.5 | 2.8 | 110 |
| 4.0 | 1.0 | 3.3 | 122 |
| 3.0 | 2.0 | 4.4 | 139 |
| 2.5 | 2.5 | 5 | 158 |
| 2.0 | 3.0 | 5.5 | 178 |
| 1.0 | 4.0 | 6.6 | 187 |
| 0 | 5.0 | 7.7 | 162 |

TABLE 10.—EFFECT OF INCREASE OF ORGANIC NITROGEN IN A SOLID CULTURE MEDIUM ON THE PRODUCTION OF ACID PROTEASE B BY THE CULTIVATION OF *ASPERGILLUS NIGER* VAR *MACROSPORUS* DBD-0406

| Bran (g.) | Corn steep liquor (g.) | Defatted soy bean meal (g.) | Organic nitrogen (percent) | Productivity of acid protease B |
|---|---|---|---|---|
| 5.0 | 0 | 0 | 2.2 | 100 |
| 4.5 | 1.0 | 0 | 2.6 | 113 |
| 3.6 | 0.8 | 1.0 | 3.6 | 121 |
| 2.7 | 0.8 | 2.0 | 4.6 | 145 |
| 1.8 | 0.4 | 3.0 | 6 | 180 |

TABLE 11.—EFFECT OF INCREASE OF ORGANIC NITROGEN IN COMBINATION OF ORGANIC NITROGEN AND INORGANIC NITROGEN IN A SOLID CULTURE MEDIUM ON THE PRODUCTION OF ACID PROTEASE B BY THE CULTIVATION OF *ASPERGILLUS NIGER* VAR. *MACROSPORUS* DBD-0406

| Composition of medium | | | Organic nitrogen (percent) | Inorganic nitrogen (percent) | Organic nitrogen/inorganic nitrogen | Productivity of acid protease B |
|---|---|---|---|---|---|---|
| Bran (g.) | Defatted soybean meal (g.) | Ammonium sulfate (mg.) | | | | |
| 5 | 0 | 0 | 2.2 | 0 | | 100 |
| 5 | 0 | 25 | 2.2 | 0.1 | 22 | 116 |
| 5 | 0 | 50 | 2.2 | 0.2 | 10 | 130 |
| 5 | 0 | 150 | 2.2 | 0.6 | 3.7 | 146 |
| 5 | 0 | 250 | 2.2 | 1.1 | 2 | 133 |
| 2.5 | 2.5 | 0 | 5 | 0 | | 151 |
| 2.5 | 2.5 | 25 | 5 | 0.1 | 50 | 151 |
| 2.5 | 2.5 | 50 | 5 | 0.2 | 25 | 154 |
| 2.5 | 2.5 | 150 | 5 | 0.6 | 83 | 166 |
| 2.5 | 2.5 | 250 | 5 | 1.1 | 45 | 151 |

TABLE 12.—EFFECT OF INCREASE OF ORGANIC NITROGEN IN COMBINATION OF ORGANIC NITROGEN AND INORGANIC NITROGEN IN A SOLID CULTURE MEDIUM ON THE PRODUCTION OF ACID PROTEASE B BY THE CULTIVATION OF *ASPERGILLUS NIGER* VAR. *MACROSPORUS* DBD-0406

| Composition of medium | | | Organic nitrogen (percent) | Inorganic nitrogen (percent) | Organic nitrogen/inorganic nitrogen | Productivity of acid protease B |
|---|---|---|---|---|---|---|
| Bran (g.) | Defatted soybean meal (g.) | Ammonium sulfate (mg.) | | | | |
| 5.0 | 0 | 150 | 2.2 | 0.6 | 3.7 | 100 |
| 4.5 | 0.5 | 150 | 2.8 | 0.6 | 4.7 | 105 |
| 4.0 | 1.0 | 150 | 3.3 | 0.6 | 5.5 | 114 |
| 3.0 | 2.0 | 150 | 4.4 | 0.6 | 7.3 | 115 |
| 2.5 | 2.5 | 150 | 5 | 0.6 | 8.3 | 122 |
| 2.0 | 3.0 | 150 | 5.5 | 0.6 | 2.2 | 125 |
| 1.0 | 4.0 | 150 | 6.6 | 0.6 | 11.0 | 138 |
| 0 | 5.0 | 150 | 7.7 | 0.6 | 12.8 | 156 |

TABLE 13.—EFFECT OF INCREASE OF ORGANIC NITROGEN IN COMBINATION OF ORGANIC NITROGEN AND INORGANIC NITROGEN IN A SOLID CULTURE MEDIUM ON THE PRODUCTION OF ACID PROTEASE B BY THE CULTIVATION OF *ASPERGILLUS NIGER* VAR. *MACROSPORUS* DBD-0406

| Composition of medium | | | Organic nitrogen (percent) | Inorganic nitrogen (percent) | Organic nitrogen/inorganic nitrogen | Productivity of acid protease B |
|---|---|---|---|---|---|---|
| Bran (g.) | Defatted soybean meal (g.) | Ammonium sulfate (mg.) | | | | |
| 5 | 0 | 150 | 2.2 | 0.6 | 3.7 | 100 |
| 4.5 | 0.5 | 150 | 2.7 | 0.6 | 4.5 | 112 |
| 4.0 | 1.0 | 150 | 3.1 | 0.6 | 5.2 | 116 |
| 3.0 | 2.0 | 150 | 4.0 | 0.6 | 6.7 | 122 |
| 2.5 | 2.5 | 150 | 4.5 | 0.6 | 7.5 | 141 |
| 2.0 | 3.0 | 150 | 5 | 0.6 | 8.3 | 147 |
| 1.0 | 4.0 | 150 | 5.9 | 0.6 | 2.8 | 164 |
| 0 | 5.0 | 150 | 6.8 | 0.6 | 11.3 | 168 |

TABLE 14.—EFFECT OF INCREASE OF ORGANIC NITROGEN IN COMBINATION OF ORGANIC NITROGEN AND INORGANIC NITROGEN IN A SOLID CULTURE MEDIUM ON THE PRODUCTION OF ACID PROTEASE B BY THE CULTIVATION OF *ASPERGILLUS NIGER* VAR. *MACROSPORUS* DBD-0406

| Composition of medium | | | Organic nitrogen (percent) | Inorganic nitrogen (percent) | Organic nitrogen/inorganic nitrogen | Productivity of acid protease B |
|---|---|---|---|---|---|---|
| Bran (g.) | Defatted soybean meal (g.) | Ammonium sulfate (mg.) | | | | |
| 5 | 0 | 25 | 2.2 | 0.11 | 20 | 100 |
| 4.5 | 0.5 | 22.5 | 2.8 | 0.1 | 28 | 109 |
| 4.0 | 1.0 | 20 | 3.3 | 0.08 | 41 | 110 |
| 3.0 | 2.0 | 15 | 4.4 | 0.06 | 73 | 129 |
| 2.5 | 2.5 | 12.5 | 5 | 0.05 | 100 | 133 |

According to our studies on the production of acid protease B of the known fungi by applying this new solid culture method, the strains belonging to *Aspergillus niger* group *Aspergillus niger* NRRL 334, *Aspergillus niger* mut. *shiemanni*, *Aspergillus carbonarius* and the like have been observed to show excellent results as shown in Tables 15 and 16.

TABLE 15.—EFFECT OF INCREASE OF ORGANIC NITROGEN SOURCE IN A SOLID CULTURE MEDIUM ON THE PRODUCTION OF ACID PROTEASE B BY THE CULTIVATION OF VARIOUS STRAINS BELONGING TO *ASPERGILLUS NIGER* GROUP

| | Productivity of acid protease B | |
|---|---|---|
| Composition of medium | Bran only | Bran:Defatted soybean meal |
| Organic nitrogen (percent) | 2.2 | 5 |
| *Asp. niger* var. *macrosporus* | 100 | 124 |
| *Asp. niger* | 100 | 182 |
| *Asp. niger* mut. *shiemanni* | 100 | 217 |
| *Asp. carbonarius* | 100 | 249 |

TABLE 16.—EFFECT OF INCREASE OF ORGANIC NITROGEN SOURCE IN A SOLID CULTURE MEDIUM ON THE PRODUCTION OF ACID PROTEASE B BY THE CULTIVATION OF VARIOUS STRAINS BELONGING TO *ASPERGILLUS NIGER* GROUP

| | Productivity of acid protease B | |
|---|---|---|
| Composition of medium | Bran 5 g. | Bran 25 g.+Defatted soybean meal; 25, g.+Ammonium sulfate, 200 mg. |
| Organic nitrogen (percent) | 2.2 | 5 |
| Inorganic nitrogen (percent) | 0 | 0.8 |
| Organic nitrogen/inorganic nitrogen | | 6.3 |
| *Asp. niger* var. *macrosporus* | 100 | 162 |
| *Asp. niger* | 100 | 177 |
| *Asp. niger* mut. *shiemanni* | 100 | 240 |
| *Asp. carbonarius* | 100 | 143 |

Further we have succeeded to increase the production of acid protease B more than 40–60% or to make twice usual production in the liquid cultivation as shown in Tables 17–20 by making the organic nitrogen content in the medium containing organic nitrogen source only more than 0.4% by adding a considerable amount of organic nitrogen source or making organic nitrogen/inorganic nitrogen in the medium containing both organic and inorganic nitrogen sources above 6 by combined use of inorganic nitrogen source and organic nitrogen source, the inorganic nitrogen source such as ammonium sulfate being made below 0.06% of nitrogen content and the organic nitrogen source such as defatted soybean meal, defatted cotton seed meal, corn steep liquor being made above 0.4% by addition of a large amount.

TABLE 17.—EFFECT OF INCREASE OF ORGANIC NITROGEN SOURCE IN A LIQUID CULTURE MEDIUM ON THE PRODUCTION OF ACID PROTEASE B BY CULTIVATION OF *ASPERGILLUS NIGER* VAR. *MACROSPORUS*

| Nitrogen source (percent) | | | Organic nitrogen (percent) | Inorganic nitrogen (percent) | Organic nitrogen/inorganic nitrogen | Productivity of acid protease B |
|---|---|---|---|---|---|---|
| Corn steep liquor | Defatted soybean meal | Ammonium sulfate | | | | |
| 1 | 1 | | 0.11 | 0 | | 100 |
| 1 | 5 | | 0.42 | 0 | | 151 |
| 1 | 6 | | 0.49 | 0 | | 243 |
| | 5 | 0.3 | 0.39 | 0.06 | 6.1 | 137 |
| | 6 | 0.3 | 0.46 | 0.06 | 7.3 | 200 |

TABLE 18.—EFFECT OF INCREASE OF ORGANIC NITROGEN SOURCE IN A LIQUID CULTURE MEDIUM ON THE PRODUCTION OF ACID PROTEASE B BY CULTIVATION OF *ASPERGILLUS NIGER* VAR. *MACROSPORUS*

| Nitrogen source (percent) | | | Organic nitrogen (percent) | Inorganic nitrogen (percent) | Organic nitrogen/inorganic nitrogen | Productivity of acid protease B |
|---|---|---|---|---|---|---|
| Corn steep liquor | Defatted soybean meal | Ammonium sulfate | | | | |
| 1 | 1 | | 0.1 | 0 | | 100 |
| 1 | 5 | | 0.37 | 0 | | 157 |
| 1 | 6 | | 0.44 | 0 | | 183 |
| | 6 | 0.3 | 0.41 | 0.06 | 6.4 | 134 |
| | 8 | 0.3 | 0.54 | 0.06 | 8.6 | 151 |

TABLE 19.—EFFECT OF INCREASE OF ORGANIC NITROGEN SOURCE IN A LIQUID CULTURE MEDIUM ON THE PRODUCTION OF ACID PROTEASE B BY CULTIVATION OF *ASPERGILLUS NIGER* VAR. *MACROSPORUS*

| Nitrogen source (percent) | | | Organic nitrogen (percent) | Inorganic nitrogen (percent) | Organic nitrogen/organic nitrogen | Productivity of acid protease B |
|---|---|---|---|---|---|---|
| Corn steep liquor | Defatted soybean meal | Ammonium sulfate | | | | |
| 1 | 1 | 0.3 | 0.11 | 0.06 | 1 | 100 |
| 1 | 6 | 0 | 0.49 | 0 | ---- | 198 |
| 1 | 6 | 0.1 | 0.49 | 0.02 | 24.4 | 200 |
| 1 | 6 | 0.3 | 0.49 | 0.06 | 7.7 | 224 |

TABLE 20.—EFFECT OF INCREASE OF ORGANIC NITROGEN SOURCE IN A LIQUID CULTURE MEDIUM ON THE PRODUCTION OF ACID PROTEASE B BY CULTIVATION OF *ASPERGILLUS NIGER* VAR. *MACROSPORUS*

| Nitrogen source (percent) | | | Organic nitrogen (percent) | Inorganic nitrogen (percent) | Organic nitrogen/inorganic nitrogen | Productivity of acid protease B |
|---|---|---|---|---|---|---|
| Corn steep liquor | Defatted soybean meal | Ammonium sulfate | | | | |
| 1 | 3 | 0 | 0.26 | 0 | ---- | 100 |
| 1 | 3 | 1.0 | 0.26 | 0.21 | 1.2 | 84 |
| 1 | 6 | 0 | 0.49 | 0 | ---- | 124 |
| 1 | 6 | 0.3 | 0.49 | 0.06 | 7.7 | 147 |

In this case the combined use of defatted soy bean meal and corn steep liquor as the organic nitrogen source was observed to be more excellent than single use of them.

According to our studies on the production of acid protease B of the known fungi by applying this new liquid culture method, the strains belonging to *Aspergillus niger* group *Aspergillus niger, Aspergillus niger* mut, *shiemanni* NRRL 361 and the like have been observed to show excellent results as shown in Table 21.

TABLE 21.—EFFECT OF INCREASE OF ORGANIC NITROGEN SOURCE IN A LIQUID CULTURE MEDIUM ON THE PRODUCTION OF ACID PROTEASE B BY THE CULTIVATION OF VARIOUS STRAINS BELONGING TO *ASPERGILLUS NIGER* GROUP

| | Productivity of acid protease B | |
|---|---|---|
| Nitrogen source | Corn steep liquor, 1%+defatted soy bean meal 3% | Corn steep liquor, 1%+defatted soy bean meal 6% |
| Organic nitrogen (percent) | 0.26 | 0.49 |
| *Asp. niger* var. *macrosporus* | 100 | 137 |
| *Asp. niger* | 100 | 145 |
| *Asp. niger* mut. *shiemanni* | 100 | 207 |

The difference between acid protease A and B will be shown as follows:

ACTIVITY OF ACID PROTEASE A AND B

| | Acid protease A | | Acid protease B (pH 2.6, 30° C.) |
|---|---|---|---|
| | (pH 2.0, 30° C.) | (pH 1.5, 55° C.) | |
| [PU]Cas.F R.γ-Tyr./ PN, mg | 969 | 3,102 | 7,201 |

EFFECT OF VARIOUS INORGANIC COMPOUNDS ON ACID PROTEASE A AND B

| Compounds | Concentration (M) | Activity (percent) | |
|---|---|---|---|
| | | Acid protease A | Acid protease B |
| Control | | 100 | 100 |
| $AgNO_3$ | $10^{-2}$ | 96.5 | 11.0 |
| $AgNO_3$ | $10^{-3}$ | 100 | 100 |
| $AgNO_3$ | $10^{-4}$ | 100 | 100 |
| $BaCl_2$ | $10^{-2}$ | 97.8 | 100 |
| $CdCl_2$ | $10^{-2}$ | 80 | 100 |
| $CoCl_2$ | $10^{-2}$ | 100 | 100 |
| $FeCl_3$ | $10^{-2}$ | 96.5 | 64 |
| $FeCl_3$ | $10^{-3}$ | 100 | 91 |
| $FeCl_3$ | $10^{-4}$ | 100 | 100 |
| $FeSO_4$ | $10^{-2}$ | 100 | 100 |
| $HgCl_2$ | $10^{-2}$ | 85 | 101 |
| $I_2$ | $10^{-2}$ | 63(1.9) (1) | 2.5(7.5) (2) |
| $I_2$ | $10^{-3}$ | 100 | 93.5 |
| $I_2$ | $10^{-4}$ | 100 | 100 |
| $KMnO_4$ | $10^{-2}$ | 0 | 0 |
| $KMnO_4$ | $10^{-3}$ | 0 | 0 |
| $KMnO_4$ | $10^{-4}$ | 69 | 0 |
| $MgCl_2$ | $10^{-2}$ | 100 | 100 |
| $MnCl_2$ | $10^{-2}$ | 98 | 120 |
| NaCl | $10^{-2}$ | 100 | 100 |
| NaF | $10^{-2}$ | 101 | 98 |
| $SrCl_2$ | $10^{-2}$ | 100 | 100 |
| $ZnCl_2$ | $10^{-2}$ | 100 | 100 |

A COMPARISON BETWEEN ACID PROTEASE A AND B ON THEIR VARIOUS PROTEOLYTIC ACTIVITIES

| Substrates | Acid protease A | | | Acid protease B | | |
|---|---|---|---|---|---|---|
| | Opt. | Enzyme content (mg.) | Enzyme activity | Opt. | Enzyme content (mg.) | Enzyme activity |
| Soybean casein [1] | 2.0 | 0.500 | 0.205 | 2.6 | 0.050 | 0.110 |
| Milk casein [1] | 2.0 | 0.500 | 0.923 | 2.6 | 0.050 | 0.809 |
| Acid-denatured hemoglobin [1] | 2.0 | 0.500 | 0.608 | 2.6 | 0.050 | 0.629 |
| Urea-denatured hemoglobin [1] | 3.0 | 0.500 | 0.542 | 4.5 | 0.050 | 0.489 |
| Egg albumin [1] | 2.0 | 1.250 | 0.406 | 2.6 | 0.125 | 0.201 |
| Wheat gluten [2] | 2.0 | 1.250 | 0.277 | 2.6 | 0.125 | 0.479 |
| Blood fibrin [2] | 1.5 | 0.500 | 4.85 | 2.6 | 0.500 | 6.05 |
| Gelatin [3] | 2.3 3.4 | 0.500 2.000 | 9.60 68.00 | 3.4 | 2.000 | 58.00 |
| Steer collagen [4] | 2.6 | 0.100 | 9.69 | 3.0 | 0.200 | 7.49 |

Enzyme activities were indicated as follows:
[1] ΔO.D., 660 mμ
[2] ΔO.D., 275 mμ
[3] $(100 - \frac{\eta sp-30}{\eta sp-0})$ (Whole solution)
[4] ηsp (Supernatant of 30,000 r.p.m., 30 min.)

EFFECT OF VARIOUS ORGANIC COMPOUNDS ON ACID PROTEASE A AND B

| Compounds | Concentration | Activity (percent) Acid protease A | Acid protease B |
|---|---|---|---|
| Ascorbic acid | $10^{-2}$M | 153 | 119 |
| N-bromosuccinimide | $10^{-2}$M | 0 | 4.5 |
| p-Chloromercuribenzoic acid | $10^{-4}$M | 95.5(94.5) (1) | 79.7(98.5) (2) |
| Desoxycholate | $10^{-2}$M | 94.5(65.5) (3) | 37(71.5) (4) |
| Cystein | $10^{-2}$M | 106.5 | 94.5 |
| α,α'-Dipyridyl | $10^{-2}$M | 97.5 | 92 |
| Ethanol | 15% | 104.5 | 102 |
| Ethanol | 20% | 100 | 92 |
| Ethanol | 25% | 59.4 | 71.8 |
| Ethanol | 30% | 1.3 | 32.4 |
| Ethylendiamine tetra acetic acid | $10^{-2}$M | 101(88) (1) | 108(93.5) (2) |
| Glutathione | $10^{-2}$M | 102 | 152 |
| Heparine | 0.05% | 94.5 | 98 |
| Hydroxylamine | $10^{-2}$M | 115(26.6) (1) | 115(56.4) (2) |
| 8-hydroxyquinoline | $10^{-2}$M | 111 | 72.5 |
| Methionine | $10^{-2}$M | 106 | 114 |
| Monoiodoacetic acid | $10^{-2}$M | 100 | 103.7 |
| Oxalic acid | $10^{-2}$M | 99.3 | 109 |
| o-Phenanthroline | $10^{-2}$M | 105.4 | 83 |
| Phenylhydrazine | $10^{-2}$M | 108 | 97.5 |
| Potato inhibiter | 0.05% | 109 | 108 |
| Sodium laurylsulfate | $10^{-2}$M | 69.2(0) (3) | 0(0) (4) |
| Soybean trypsin inhibiter | 0.05% | 99.5 | 99.6 |
| Taurocholate | $10^{-2}$M | 102.8(91.6) (1) | 100(102) (2) |
| Urea | $10^{-2}$M | 107 | 109 |

EFFECT OF VARIOUS ANTIBIOTICS ON ACID PROTEASE A AND B

| Antibiotics | Concentration (M) | Activity (percent) Acid protease A | Acid protease B |
|---|---|---|---|
| 6-aminopenicillanic acid | $10^{-5}$ | 99.3 | 102.3 |
| Chloramphenicol | $10^{-3}$ | 109 | 104 |
| Gramicidin J | $10^{-4}$ | 99.2 | 82.5 |
| Kanamycin | $10^{-2}$ | 103.8 | 105 |
| Penicillin G | $10^{-2}$ | 95.4 | 107 |
| Streptomycin | $10^{-2}$ | 101 | 101.5 |
| Tetracycline | $10^{-2}$ | 108.8 | 97 |
| M-1028 | $10^{-5}$ | 102 | 84 |
| M-1346 | $10^{-2}$ | 105.2 | 103 |
| M-1354 | $10^{-2}$ | 103.5 | 94 |
| M-1356 | $10^{-4}$ | 105 | 99.2 |
| M-1362 | $10^{-2}$ | 101 | 100.5 |

AMINO ACID COMPOSITION OF ACID PROTEASE A AND B FROM *ASPERGILLUS NIGER* VAR. *MACROSPORUS*, AND PEPSIN

| Amino acid | No. of residues per 1000 residues of amino acids | | |
|---|---|---|---|
| | Acid protease A | Acid protease B | Pepsin* |
| Aspartic acid | 109 | 117 | 128 |
| Threonine | 118 | 87 | 82 |
| Serine | 131 | 140 | 128 |
| Glutamic acid | 112 | 82 | 79 |
| Proline | 21 | 39 | 44 |
| Glycine | 115 | 103 | 111 |
| Alanine | 77 | 78 | 52 |
| Cystine (½) | (9) | (4) | 17 |
| Valine | 94 | 83 | 61 |
| Methionine | 5 | 5 | 15 |
| Isoleucine | 37 | 40 | 79 |
| Leucine | 32 | 61 | 82 |
| Tyrosine | 50 | 52 | 52 |
| Phenylalanine | 38 | 41 | 41 |
| Tryptophane | 26 | 16 | 17 |
| Lysine | 17 | 31 | 3 |
| Histidine | 7 | 10 | 3 |
| Arginine | 2 | 11 | 6 |
| NH₃ | (95) | (108) | 105 |

*O. O. Blumenfeld and G. E. Perlmann, J. Gen. Physiol., 42, 553 (1959).

Acid protease A and acid protease B may be purely isolated from the crude enzyme powder by the processes shown in the following flow sheet.

```
              CRUDE ENZYME POWDER
                      │
         PRECIPITATED WITH AMMONIUM SULFATE
                 (50% SATURATION)
                      │
           DESALTED & BUFFER-CHANGED
              WITH SEPHADEX G-25
                      │
         CHROMATOGRAPHED WITH HYDROXYLAPATITE
              BUFFER: pH 6.0 PHOSPHATE BUFFER
                    0.002M-0.1M+0.5M NaCl
                      │
         ┌────────────┴────────────┐
   FRACTION (I)              FRACTION (II)
         │                         │
 DESALTED & BUFFER-CHANGED   DESALTED & BUFFER-CHANGED
 WITH SEPHADEX G-25          WITH SEPHADEX G-25
         │                         │
 CHROMATOGRAPHED WITH        CHROMATOGRAPHED WITH
 DEAE-CELLULOSE              SE-CELLULOSE
   BUFFER: pH 6.0 PHOSPHATE    BUFFER: μ=0.03 MCILVAINE
           BUFFER                       BUFFER
        0.01M-0.1M+                    pH 3.0-7.0
          0.5M NaCl
         │                         │
 DESALTED & BUFFER-CHANGED   DESALTED & BUFFER-CHANGED
 WITH SEPHADEX G-75          WITH SEPHADEX G-75
   BUFFER: pH 3.5 MCILVAINE    BUFFER: pH 3.5 MCILVAINE
           BUFFER                       BUFFER
          μ=0.03                       μ=0.03
         │                         │
     FREEZE-DRIED              FREEZE-DRIED
         │                         │
   ACID PROTEASE A           ACID PROTEASE B
```

The present invention will be explained more in detail by way of examples as follows:

EXAMPLE 1

Potato-sucrose agar slant cultures of the following strains were prepared. A mixture of bran 25 g. and defatted soy bean meal 25 g. was added with 60 ml. of water and put in 1 l. volume Erlenmyer flask which was then sterilized. After cooling, each strains from the slant cultures were inoculated in the sterilized culture media and cultivated at 33° C. for 4 days. The cultures were extracted with 500 ml. of water and the extracts were added with ammonium sulfate up to 75% saturation. The precipitates thus formed were dried to obtain the enzymes as follows:

| Name of strain | Weight of crude enzyme harvested (g.) | Weight of pure enzyme calculated | |
|---|---|---|---|
| | | Acid protease A (mg.) | Acid protease B (mg.) |
| Aspergillus niger var. macrosporus DBD-0406 | 12 | 55 | 308 |
| Aspergillus niger IAM 2532 | 10 | 50 | 191 |
| Aspergillus niger mut. shiemanni IAM 2531 | 12.5 | 43 | 266 |
| Aspergillus aureus var. acidus IAM 2281 | 9 | 77 | 281 |
| Aspergillus aureus var. brevis IAM 2091 | 7 | 35 | 44 |
| Aspergillus batatae IAM 2098 | 7.5 | 23 | 192 |
| Penicillium frequentans IAM 7082 | 5 | 53 | 78 |
| Penicillium thomii IAM 7006 | 4 | 11 | 35 |

EXAMPLE 2

Potato-sucrose agar slant cultures of the following strains were prepared. A mixture of bran 25 g. and defatted soy bean meal 25 g. was added with 40 ml. of 5% aqueous solution of ammonium sulfate and put in 1 l. volume Erlenmyer flask which was then sterilized. After cooling, each strains from the slant cultures were inoculated in the sterilized culture media and cultured at 33° C., for 4 days. The cultures were extracted with 500 ml. of water and the extracts were added with ammonium sulfate up to 75% saturation. The precipitates thus formed were dried to give the enzymes as follows:

| Name of strain | Weight of crude enzyme harvested (g.) | Weight of pure enzyme calculated | |
|---|---|---|---|
| | | Acid protease A (mg.) | Acid protease B (mg.) |
| Aspergillus niger var. macrosporus DBD-0406 | 15 | 83 | 396 |
| Aspergillus niger IAM 2532 | 11 | 36 | 216 |
| Aspergillus niger mut. shiemanni IAM 2531 | 13.5 | 70 | 290 |
| Aspergillus carbonarius IAM 2557 | 11.8 | | 104 |

EXAMPLE 3

Potato-sucrose agar slant cultures of the following strains were prepared. A liquid culture media composed of starch 1%, corn steep liquor 1%, defatted soy bean meal 6%, ammonium sulfate 0.3%, $K_2HPO_4$ 0.1% and $CaCO_3$ 1% were separately put in 100 ml. volume Erlenmyer flasks 15 ml. apiece and sterilized. After cooling, each strains from the slant cultures were inoculated in the sterilized culture media and shake-cultured at 32° C. for 6 days. To the culture filtrates ammonium sulfate was added up to 75% saturation. The precipitates thus formed were dried to give the enzymes as follows:

| Name of strain | Weight of crude enzyme harvested (g.) | Weight of pure enzyme calculated | |
|---|---|---|---|
| | | Acid protease A (mg.) | Acid protease B (mg.) |
| Aspergillus niger var. macrosporus DBD | 14 | 62 | 325 |
| Aspergillus niger IAM 2532 | 17 | 75 | 255 |
| Aspergillus aureus var. brevis IAM 2091 | 14 | 46 | 272 |
| Aspergillus batatae IAM 2098 | 20 | 50 | 188 |

EXAMPLE 4

The following strains were inoculated in a liquid culture media composed of starch 1%, corn steep liquor 1%, defatted soy bean meal 6%, $K_2HPO_4$ 0.1% and $CaCO_3$ 1% and cultured as in Example 1. The culture filtrates were subjected to salting out with ammonium sulfate to give the enzymes as follows:

| Name of strain | Weight of crude enzyme harvested (g.) | Weight of pure enzyme calculated | |
|---|---|---|---|
| | | Acid protease A (mg.) | Acid protease B (mg.) |
| Aspergillus niger var. macrosporus DBD-0406 | 14.5 | 59 | 281 |
| Aspergillus niger IAM 2532 | 22 | 59 | 344 |
| Aspergillus aureus var. brevis IAM 2001 | 12 | 45 | 225 |

We claim:
1. A process for simultaneously producing a new high acid protease (A) which has an optimum active pH at pH 2.0, 30° C. and exhibits high activity even at pH 1.5, 55° C., in addition to a usual acid protease (B) which has an optimum active pH at pH 2.6, 30° C. and substantially no activity at pH 1.5, 55° C. which comprises cultivating Aspergillus niger var. macrosporus DBD-0406 (ATCC-16513) in a culture medium containing for a liquid culture above 0.4 percent of organic nitrogen and an effective amount but less than 0.06 percent of inorganic nitrogen such that the ratio of organic nitrogen to inorganic nitrogen is at least 6 and for a solid culture above 2.5 percent of organic nitrogen, and an effective amount but less than 0.6 percent of inorganic nitrogen such that the ratio of organic nitrogen to inorganic nitrogen is at least 4.

2. A process for the production of acid protease B by a solid culture method as claimed in claim 1 in which an organic nitrogen source is used, the organic nitrogen content in the medium being more than 4%.

3. A process as claimed in claim 2 in which an inorganic nitrogen source is also present, such that the ratio of organic nitrogen to inorganic nitrogen is at least 6.

4. A process for the produtcion of acid protease B by a liquid culture medium as claimed in claim 1 in which an organic nitrogen source is used, said source being selected from the group consisting of defatted soy bean meal and defatted cotton seed meal in combination with corn steep liquor.

References Cited

UNITED STATES PATENTS 3,149,051  9/1964  Yoshida et al. _________ 195—65
3,186,921  6/1965  Rupe _________________ 195—66

FOREIGN PATENTS 386,579  5/1963  Japan.

OTHER REFERENCES

Koaze et al.: Agricultural and Biological Chemistry, vol. 28, No. 4, pp. 216–223, 1964.

LIONEL M. SHAPIRO, Primary Examiner

U.S. Cl. X.R.

195—62